June 8, 1937.  T. A. LONG ET AL  2,083,462

DISINTEGRATING MACHINERY

Filed May 28, 1935

Inventor
Thomas A. Long
William W. Potts
By Watson, Coit, Morse & Grindle
Attys.

Patented June 8, 1937

2,083,462

UNITED STATES PATENT OFFICE 2,083,462

DISINTEGRATING MACHINERY

Thomas Adam Long and William Wallace Potts, Sheffield, England

Application May 28, 1935, Serial No. 23,906
In Great Britain June 6, 1934

4 Claims. (Cl. 83—8)

This invention relates to disintegrating machinery of the type in which material is fed to the wider space between two opposed rotary discs mounted to revolve about axes which are oblique to one another, projecting pins are provided upon the opposed faces of the two discs and the product is discharged through the narrower space between the discs, opposite the feed space.

One object of the invention is the provision of improved machinery for producing more uniformly graded material.

Another object of the invention is to provide machinery of the nature set forth in which both discs are driven, one from the other.

Yet another object is to increase the width of the space between the discs, where the material to be reduced is fed to them, while maintaining the space between the discs narrow, where the reduced material is discharged.

Another object is to enlarge the opposed regions of the discs, where they approach one another.

A still further object of the invention is to provide means for preventing damage if material of excessive hardness or size is fed between the discs.

According to a feature of the present invention one of the discs receives a rotary drive from the other through the agency of engaging sets of teeth or driving dogs respectively located upon each disc in a circle concentric with the axis of the disc and preferably nearer than the projecting pins to the axis.

The teeth or driving dogs of each disc preferably project substantially parallel to the disc axis after the manner of the teeth of a crown wheel. They may have engaging and driving faces including surfaces lying in planes containing the disc axis. However, the driving faces of the teeth or dogs preferably include surfaces oblique to the disc axis but containing radii, so that the teeth or dogs taper from root to end in an axial direction.

The end portions of the teeth or dogs may be substantially pointed or formed after the manner of crown wheel teeth. For example the driving face aforementioned on each side of each tooth may merge into a curved portion struck in an approximately circular arc from a point in the opposite driving surface of that tooth, so that the profile of the tooth consists of a rectangle or trapezium merged into two intersecting approximately circular arcs each struck from the corner of the rectangle opposite to that with which it merges.

The ends of the teeth or dogs may be normal to the disc axis or may be inclined thereto to lie in a conical surface. The inside faces of the teeth may also lie in a conical surface.

Preferably means are provided for enabling one or both of the discs to move axially and a spring control tends to cause the discs to approach one another with or without means for adjusting the normal working distance between the discs.

When one or both of the rotary discs is movable axially, for example against a spring bias, the driving teeth or dogs preferably project axially from each disc sufficiently far to preclude the possibility of complete dis-engagement by axial motion of the disc or discs.

The discs may both be plane but, according to another feature of the invention, the operative face of one or each of the rotatably mounted discs has a conical formation thus reducing the angle of inclination between the two faces on the narrower or discharge side of the disc axis and increasing it on the feed side. The conical formation may extend from the edge or periphery of the disc and may be continued to an apex on the disc axis or it may be truncated to reduce the conical portion to the desired extent.

The angle of the cone giving the conical formation is preferably so related to the inclination of the disc axes that the two operative faces of the discs are parallel to each other in the plane containing their axes on the narrower or discharge side. The narrower or discharge portion of the space between the two discs is preferably below, and may conveniently be in a vertical plane containing, the disc axes. In a preferred arrangement one of the discs has a plane face and is mounted upon a horizontal axis, the other disc having a conical formation and being mounted about an axis which is inclined to the horizontal.

One example of disintegrating machinery is shown by way of illustration only in the accompanying partly diagrammatic drawing, in which:—

Figure 1:
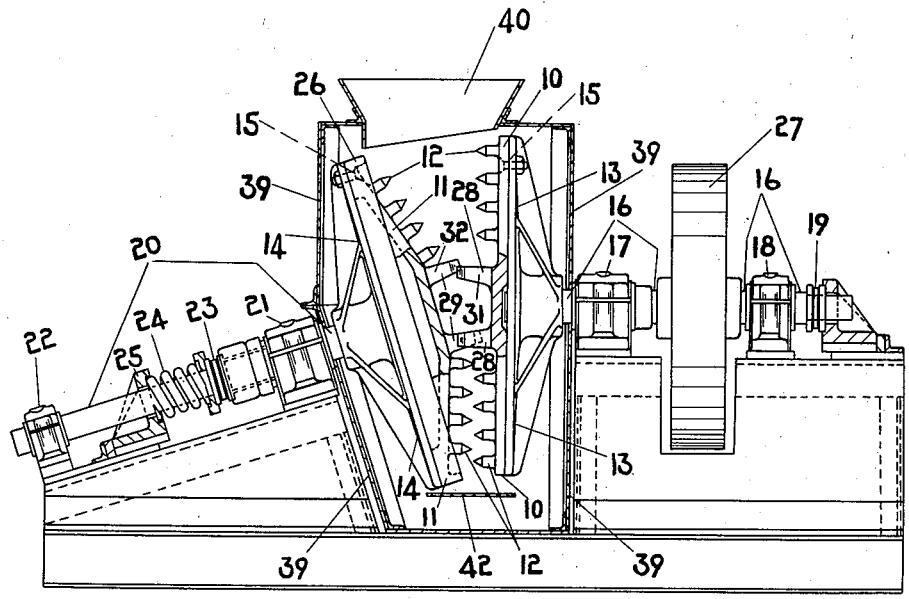
Figure 1 is a part elevation and part section, the housing of the disintegrating discs being shown in section.
Figures 2, 3:
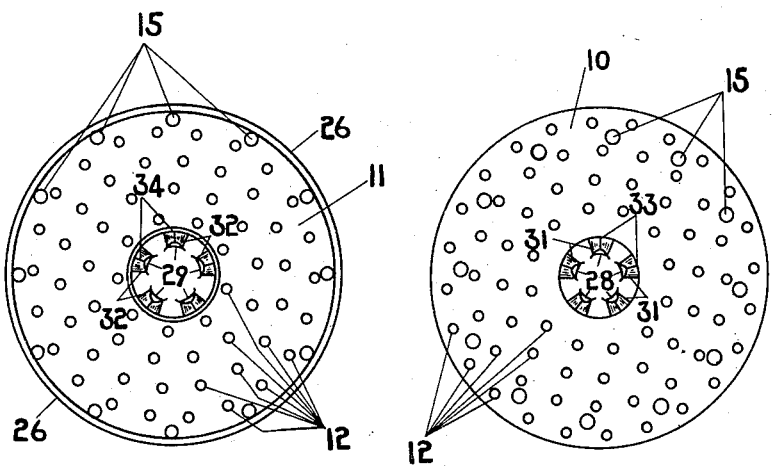
Figure 2 is an elevation in an axial direction of the conical disc shown, partly in section, in Figure 1.
Figure 3 is an elevation of the plane disc shown, partly in section, in Figure 1.

Two discs 10 and 11 provided with disintegrating or splitting projections 12, integral therewith or rigidly secured thereto, are respectively secured to face plates 13 and 14 by countersunk bolts such as 15. The face plate 13 is mounted upon and keyed to a horizontal shaft 16 carried in bearings 17 and 18 and equipped with a thrust bearing 19. The face plate 14 is mounted upon and keyed to a shaft 20 which is mounted to move axially in bearings 21 and 22 and inclined to the horizontal as shown. The shaft 20 is provided with a thrust bearing 23 which bears against a buffer spring 24 seating against a bracket 25.

The operative face, from which the projections 12 extend, of the disc 10 may be plane and perpendicular to the axis of the shaft 16 as shown, or in some cases this operative face may be conical. The operative face of the disc 11 takes the form of a truncated cone. A peripheral rim 26 may, however, be provided thereon. The semi-angle of the cone providing the conical formation of the disc 11 is, when the disc 10 is plane, equal to the inclination of the shafts 16 and 20 so that the narrower space between the two discs in a plane containing the two axes is parallel, as shown in Figure 1. The shafts 16 and 20 are preferably so arranged that their axes lie in a vertical plane and so that the narrower space between the discs 10 and 11 is below the shafts 16 and 20.

For the purpose of driving the machine, a driving pulley 27 is mounted upon and keyed to the shaft 16 so that this shaft, the face plate 13 and disc 10 may be rotated thereby.

In order that the disc 11 should receive a rotary drive from the disc 10, engaging sets of teeth or driving dogs 28 and 29 (of which two only are shown on each disc in Figure 1) are respectively located upon the discs 10 and 11 pitched upon circles concentric with the axes of the discs and preferably nearer than the projecting pins 12 to the axes. These teeth or driving dogs 28 and 29 preferably project, as shown, substantially parallel to the axes of their respective discs after the manner of the teeth of a crown wheel and have respectively engaging surfaces 31 and 32 which may lie in planes containing the disc axes or in planes slightly oblique to the disc axes but containing radii so that the teeth or dogs taper from root to end in an axial direction. The end portions 33 and 34 of the respective teeth or dogs are preferably substantially pointed or formed after the manner of crown wheel teeth. For example the driving faces 31 and 32 on each side of the teeth may merge into curved end portions struck in approximately circular arcs from points in the opposite driving surfaces of the teeth so that the profile of each tooth consists of a rectangle or trapezium merging into two intersecting circular arcs each struck from the corner of the rectangle opposite to that with which it merges. The extremities of the end portions 33 and 34 of the teeth or dogs 28 and 29 may be, as shown in Figure 1, normal to the axes of the discs or they may be inclined thereto to lie in conical surfaces. Moreover the inside faces of the teeth may also, as indicated in Figure 1, lie in conical surfaces.

When one, as shown, or both of the rotary discs 10 and 11 is movable axially, against the bias of the spring 24, the driving dogs 28 and 29 project axially from each disc sufficiently far to preclude the possibility of complete disengagement by axial motion of the disc or discs. Moreover, when, as shown, one of the discs 11 is conical and its axis is oblique to that of the other disc 10, the driving dogs 29 on the conical disc are preferably pitched upon a somewhat larger circle than that upon which the driving dogs 28 are pitched and the tooth forms of the two sets of dogs differ slightly, being adjusted so that a uniform drive is obtained by engagement of the dogs below the axes.

The discs 10 and 11 and face plates 13 and 14 are enclosed by a casing, indicated generally at 39, provided with a feed entry 40 at the top and a discharge orifice near the bottom. Preferably a tray or trough 42 is provided below the discs 10 and 11 to collect disintegrated material and deliver this to the discharge orifice.

The number of teeth or dogs on each disc is preferably the same, so that both discs rotate at the same speed. Five teeth on each disc have been found to give satisfaction. In the case of a machine with a flat disc and a conical disc, both three feet in diameter, the set of teeth of the flat disc may conveniently have an outside diameter of 8½ inches and that of the conical disc 9¼ inches. The inner diameters at the tooth roots may be respectively 4¾ inches and 5½ inches. The inner diameters at the tooth ends may be 6 inches and 6¾ inches respectively, and the axial length of the teeth from end to root may be 5 inches.

For operation of the machine the narrower space between the discs 10 and 11 is adjusted, by moving the shaft 16 axially and appropriate adjustment of its thrust bearing 19 to produce the required degree of reduction and grading of the raw material. The raw material is fed in through the feed opening 40 to the wider space between the discs 10 and 11 at the top of the machine. The disc 10 is rotated by driving the pulley 27 from line shafting and the disc 11 is rotated at the same speed by engagement of the dogs 28 and 29. The material travels round with the discs 10 and 11 towards the narrower space between these, being disintegrated during such travel, the disc 11 yielding axially when necessary against the restrain of the spring 24. The disintegrated material is discharged through the narrower space between the discs 10 and 11 near the lower portion of the machine into the trough 42 and thence to the discharge opening.

What we claim is:—

1. Disintegrating machinery for reducing lump material by fracture comprising two opposed rotary discs mounted to revolve about axes which are oblique to one another, projecting pins upon the opposed faces of the discs, means permitting axial movement of one of said discs, means for driving one of said discs, and engaging sets of driving dogs respectively located upon each disc in a circle concentric with the axis thereof and projecting parallel to the axis for transmitting rotation from the driven disc to the other disc, with the projecting pins of the respective discs out of contact with one another in all operative positions.

2. Disintegrating machinery for reducing lump material by fracture comprising two opposed rotary discs, of which one at least has a conical operative surface, said discs being mounted to revolve about axes which are oblique to one another, projecting pins upon the opposed faces of the discs, means permitting axial movement of one of said discs, resilient means for restraining said axial movement, means for driving one of said discs, engaging sets of driving dogs respectively located upon each disc in a circle concentric with the axis thereof and projecting parallel to the axis for transmitting rotation from the driven disc to the other disc, with the projecting pins of the respective discs out of contact with one another in all operative positions.

3. Disintegrating machinery for reducing lump material by fracture comprising two opposed rotary discs, of which one at least has a conical operative surface, said discs being mounted to revolve about axes which are oblique to one another, projecting pins upon the opposed faces of the discs, means permitting axial movement of one of the said discs, resilient means for restraining said axial movement, means for driving one of said discs, engaging sets of driving dogs respectively located upon each disc in a circle concentric with the axis thereof, nearer than the projecting pins to the axis and projecting parallel to the axis for transmitting rotation from the driven disc to the other disc, with the projecting pins of the respective discs out of contact with one another in all operative positions.

4. Disintegrating machinery for reducing lump material by fracture comprising two opposed rotary discs, of which one has a truncated conical operative surface bounded by a plane transverse to the axis and the other has a plane operative surface, said discs being mounted to revolve about axes which are oblique to one another, rigid projecting pins upon the opposed faces of the discs, means permitting axial movement of one of the discs away from the other, resilient means for restraining said axial movement, positive adjustable means for adjusting the discs to a desired normal minimum working distance between the discs, a plurality of driving dogs on said frusto-conical disc projecting axially of said disc adjacent the intersection of the conical operative surface with the bounding surface transverse to the axis, a corresponding plurality of driving dogs located in a circle concentric with the axis of said plane-surfaced disc and projecting axially therefrom, the axial projections of said driving dogs being at least equal to said limited axial movement whereby said discs are driven in predetermined angular relation and with the projecting pins of the respective discs out of contact with one another.

THOMAS ADAM LONG.
WILLIAM WALLACE POTTS.